H. W. ROELING, E. H. WILLIAMS, AND J. G. BAUER.
MANIFOLD FOR INTERNAL COMBUSTION ENGINES.
APPLICATION FILED JULY 19, 1920.
1,413,431.                                    Patented Apr. 18, 1922.
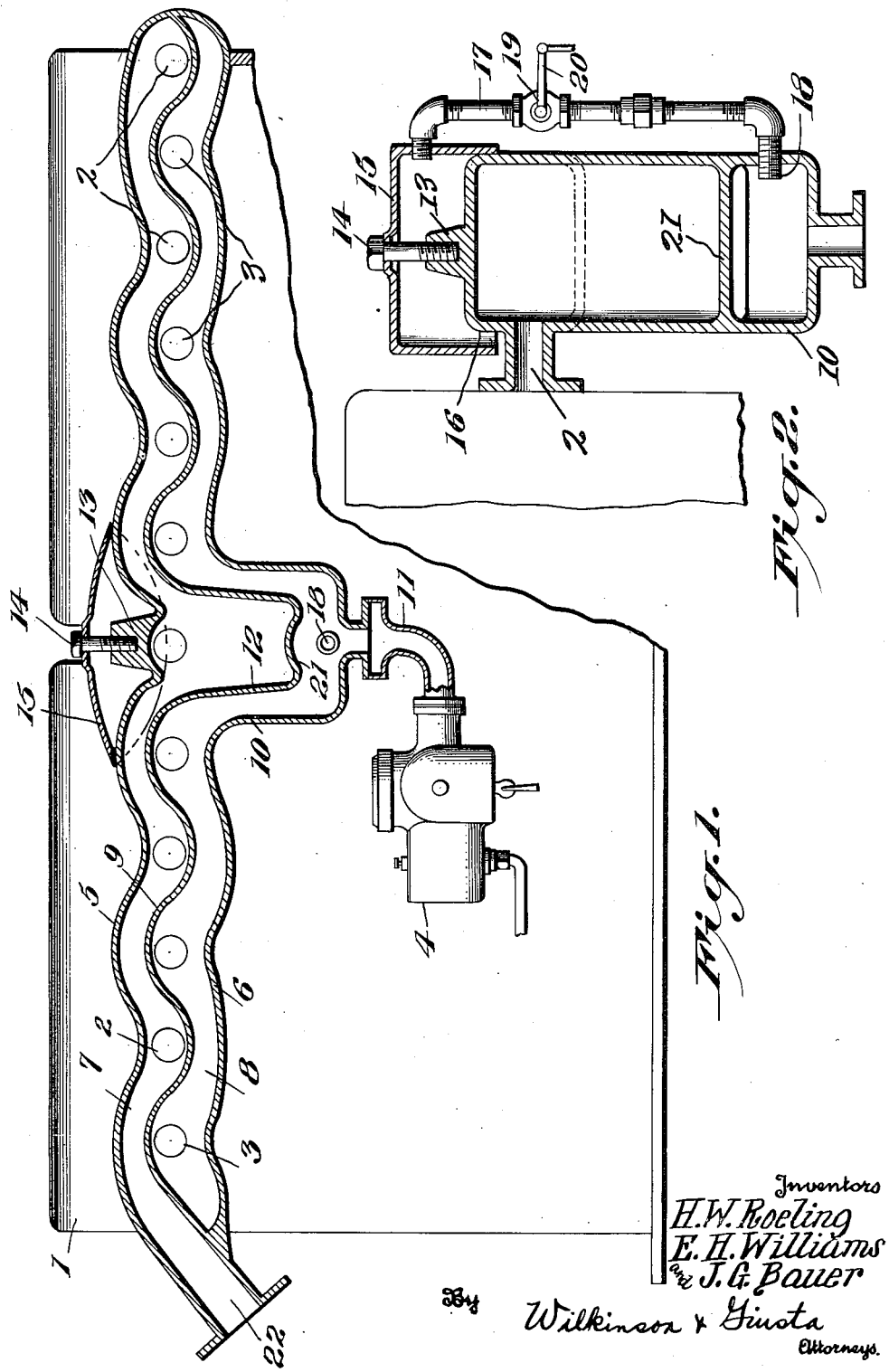

UNITED STATES PATENT OFFICE.

HENRY WILLIAM ROELING, EDWARD HUGH WILLIAMS, AND JOHN GEORGE BAUER, OF NEW ORLEANS, LOUISIANA.

MANIFOLD FOR INTERNAL-COMBUSTION ENGINES.

1,413,431. Specification of Letters Patent. Patented Apr. 18, 1922.

Application filed July 19, 1920. Serial No. 397,474.

*To all whom it may concern:*

Be it known that we, HENRY WILLIAM ROELING, EDWARD HUGH WILLIAMS, and JOHN GEORGE BAUER, citizens of the United States, and all residing at New Orleans, in the parish of Orleans and State of Louisiana, have invented certain new and useful Improvements in Manifolds for Internal-Combustion Engines; and we do hereby declare the following to be a full, clear, and exact description of the invention, such as will enable others skilled in the art to which it appertains to make and use the same.

The present invention relates to improvements in manifolds for internal combustion engines, and more particularly refers to a manifold for internal combustion engines whereby advantage may be taken of the heat of the exhaust products and the same utilized to raise the temperature of the incoming charge.

An object of the invention is to provide a manifold of the above character which will be comprised within a minimum of space, be exceedingly compact, simple and inexpensive in construction, and which will act to efficiently heat the carbureted air received from the carburetor or other device on its way into the cylinders of the engine.

Another object of the invention resides in providing a manifold which is divided by a wave-like partition which separates the intake from the exhaust ports, and which partition divides the manifold into intake and exhaust spaces so that heat may be transmitted therethrough from the exhaust space to the intake space.

A further object of the invention resides in providing an improved air heater in combination with the central part of the manifold, and in furnishing a control for the introduction of air to the manifold.

The invention will be more fully understood after reference to the accompanying drawings in which like parts are indicated by similar reference symbols throughout the several views, and in which:—

Figure 1 is a fragmentary view, partly in elevation and partly in section, showing an improved gas generator or manifold constructed according to the present invention; and Figure 2 is a central vertical sectional view through the same.

Referring more particularly to the drawings, 1 designates generally a gas engine having six cylinders provided with the exhaust ports 2 and with the intake ports 3.

A carburetor is designated at 4, which is in communication with a source of liquid fuel supply, which acts in the usual manner to convert the liquid fuel into a gaseous charge preparatory to delivering it to the engine cylinders where it is ignited in the customary way.

It has been a problem heretofore to prepare the charge and raise it to a temperature where it will ignite with the maximum of efficiency, and a great many devices have been proposed for solving this problem.

In accordance with the present invention we provide a manifold having corrugated or wave-like walls 5 and 6, which form tortuous passages 7 and 8, separated by a corrugated or wave-like partition 9 which traverses the manifold horizontally and longitudinally. The corrugations or waves in the walls 5 and 6 agree with those in the partition 9. The partition 9 moves in its wave-like passage in and out between the adjacent exhaust and intake ports 2 and 3, respectively, so that the upper space 7 forms an exhaust passage, while the lower space 8 provides an intake passage.

The central part of the manifold is provided with a depressed portion 10, at the base of which there is formed an elbow 11 having connection to the carburetor 4. The central portion of the partition 9 also dips down as indicated at 12 in order to retain the space 8 substantially uniform throughout, and also to permit the exhaust products to circulate close to the point at which the carbureted charge enters the manifold, and also where the additional air is injected, as hereinafter described.

The central portion of the upper wall 5 extends down very close to the central exhaust port, and is provided with a boss 13 to receive the screw 14 by which the heater cover 15 is secured in place. This heater cover provides a space 16 at the back, in communication with the atmosphere to allow air to enter beneath the hood and come in contact with the heated walls of the manifold previous to its delivery to the intake space.

A pipe 17 is adapted to deliver air from the space within the hood 15 to a point 18 between the portions 10 and 12 of the manifold and directly in the path of the incoming charge.

A valve 19 is included in the pipe 17, and is provided with an operating mechanism 20 which may be returned to the instrument board or steering column of the vehicle for manipulation by the driver.

The base of the portion 12 is arched upwardly, as indicated at 21, in order to disperse the charge to opposite sides so that it may enter both branches of the intake space 8.

In use the ignited products will be ejected from the engine cylinders through the ports 2 and in a high state of heat will circulate through the tortuous passage 7 giving up large quantities of its heat to the partition 9. The products will pass off through the connection 22 to the manifold muffler in the usual manner.

The charge formed in the carburetor 4 will pass through the elbow 11 and enter the space 8 at the base of the depressed portion 10. At this point it will be met by heated air received from the hood 15 and delivered through the pipe 17 in quantities controlled by the valve 19. This will raise the temperature of the incoming charge which will immediately thereafter be blown against the arched base 21 by which it will be forced in opposite directions to opposite sides of the depressed portion 10. This arched portion 21 is also heated to a high degree by the exhaust products which will further add to the temperature of the charge. This initial heated charge will thereafter circulate through both branches of the passage 8, and coming into contact with all parts of the heated partition 9 it will receive a temperature suitable for producing the highest efficiency when exploded in the cylinders.

The heated charge will be admitted through the ports 3, as the intake valves are periodically opened in the usual manner.

It will be obvious that various modifications might be made in the herein described apparatus, and in the construction, combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. In combination with an internal combustion engine having intake and exhaust ports, of a manifold having upper and lower corrugated walls, a central partition of wave-like form passing horizontally between said upper and lower walls and between the intake and exhaust ports whereby to form an upper exhaust passage, and a lower intake passage in the manifold, the central portion of said lower wall being depressed centrally, a carburetor in connection with the base of said depressed portion, an air heater placed in connection with the depressed portion of said lower wall, the partition being also depressed centrally within the first named depressed portion and having an arched base, substantially as described.

2. A manifold for internal combustion engines having intake and exhaust ports comprising a pair of parallel passages connecting respectively with the intake and exhaust passages and being separated one from the other, said intake passage having a depressed portion in communication with a source of prepared fuel supply, said exhaust passage having one wall dipping down into the depressed portion and being formed to disperse the incoming charge to all parts of the intake passage, the top portion of the exhaust passage being depressed inwardly at one point, a heater casing in communication with the atmosphere being secured over such depressed portion of the exhaust passage, and a controllable passage leading from the casing to the depressed portion of the intake manifold whereby to direct heated air into the incoming stream of prepared fuel, substantially as described.

3. A manifold for internal combustion engines having a plurality of intake and exhaust ports, corrugated walls extending above and below said intake and exhaust ports, a central partition of serpentine form passing in and out between the intake and exhaust ports and providing an exhaust passage with the upper corrugated wall and an intake passage with the lower corrugated wall, said lower corrugated wall being centrally depressed and being in communication at the central portion of its depressed part with a source of prepared fuel supply, the intermediate portion of said corrugated wall dipping down within the depressed portion of the lower wall and having a concaved under face to receive the incoming prepared charge and divert it to opposite sides of the depressed portion, the upper corrugated wall being depressed at one part slightly into the dipped down portion of the partition, a heater casing in communication with the atmosphere secured over the depressed part of the upper wall, and a conduit placing the heater casing in controllable connection with the depressed part of the lower wall and adapted to deliver heated air into the incoming stream of prepared charge, substantially as described.

HENRY WILLIAM ROELING.
EDWARD HUGH WILLIAMS.
JOHN GEORGE BAUER.